UNITED STATES PATENT OFFICE.

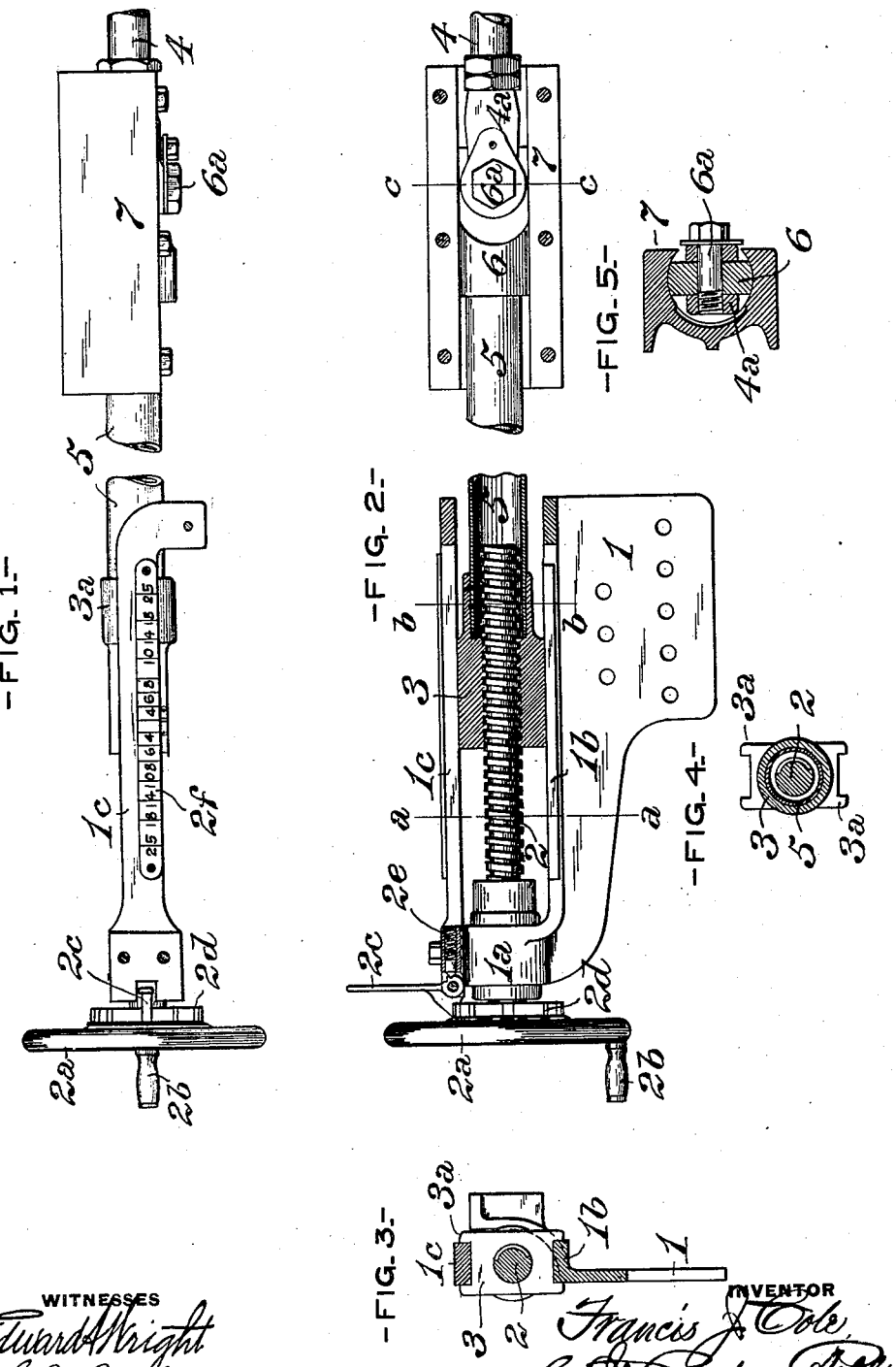

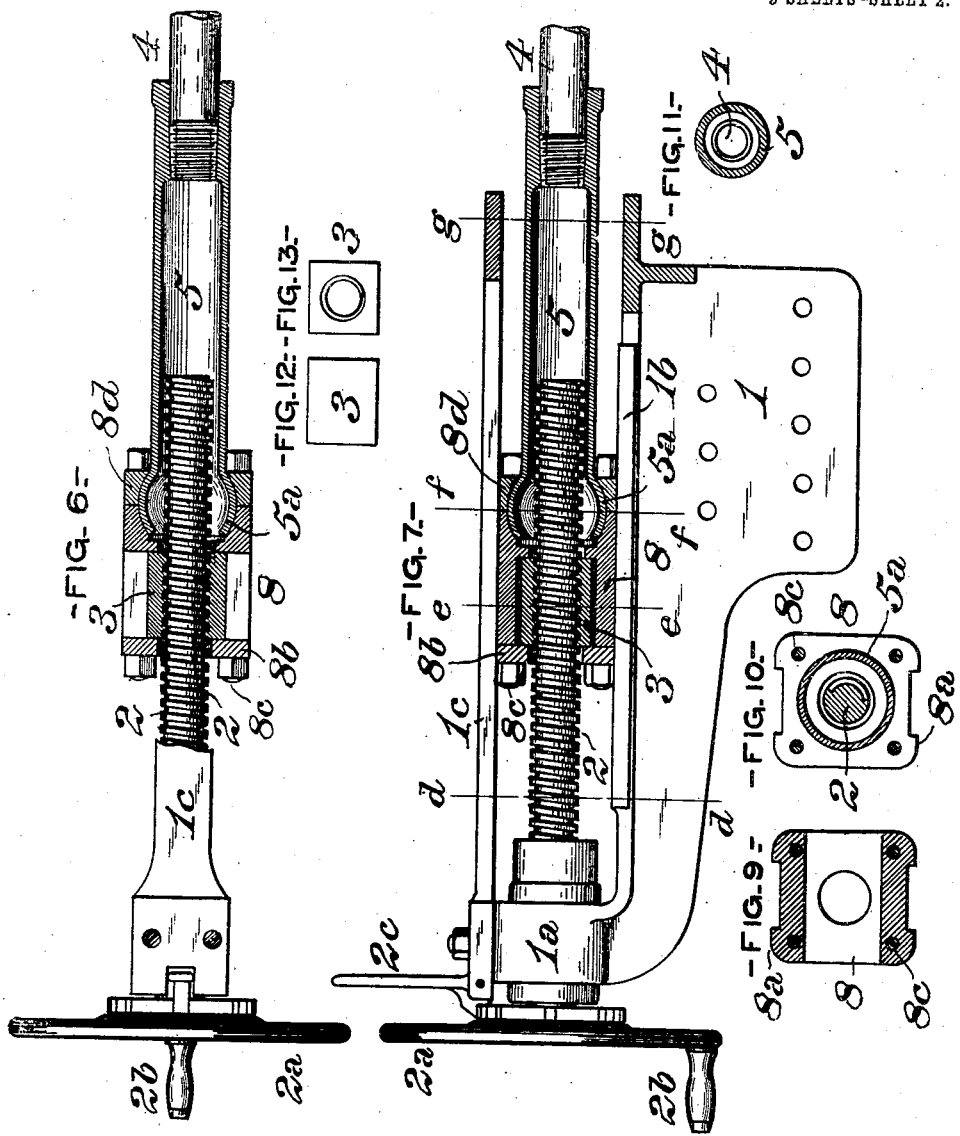

FRANCIS J. COLE, OF SCHENECTADY, NEW YORK.

REVERSE-GEAR FOR STEAM-ENGINES.

1,023,995.   Specification of Letters Patent.   Patented Apr. 23, 1912.

Application filed November 20, 1911. Serial No. 661,371.

*To all whom it may concern:*

Be it known that I, FRANCIS J. COLE, of Schenectady, in the county of Schenectady and State of New York, have invented a certain new and useful Improvement in Reverse-Gear for Steam-Engines, of which improvement the following is a specification.

My invention, which relates to reverse gears of the screw type, is more particularly designed for application in locomotive engines, and its object is to provide an appliance of such type which shall be of simple, compact, and inexpensive construction, of ready applicability in locomotives of the various present standard types, and, in operation, be exempt from lateral strains inducing undue wear and bending of members.

The improvement claimed is hereinafter fully set forth.

In the accompanying drawings: Figure 1 is a plan or top view of a locomotive engine reverse gear, illustrating an application of my invention; Fig. 2, a side view, partly in elevation and partly in vertical longitudinal central section of the same; Fig. 3, a vertical transverse section, on the line $a\ a$ of Fig. 2; Fig. 4, a similar section through the nut, reach rod connection, and screw, on the line $b\ b$ of Fig. 2; Fig. 5, a similar section, on the line $c\ c$ of Fig. 2; Fig. 6, a view, partly in plan, and partly in horizontal longitudinal central section, illustrating a structural modification; Fig. 7, a side view, partly in elevation and partly in vertical longitudinal central section, of the same; Fig. 8, a vertical transverse section, on the line $d\ d$ of Fig. 7; Fig. 9, a similar section through the cross head, on the line $e\ e$ of Fig. 7; Fig. 10, a similar section through the cross head, reach rod connection, and screw, on the line $f\ f$ of Fig. 7; Fig. 11, a similar section through the cross head connection, on the line $g\ g$ of Fig. 7; Fig. 12, a side view, in elevation, of the nut; and Fig. 13, an end view of the same.

Referring first to Figs. 1 to 5 inclusive, in the practice of my invention I provide a support, 1, which, in the instance shown, is a stout plate of metal, adapted to be bolted to the side of a locomotive firebox or otherwise held in desired position relatively to the valve gear, the adjustment of which is to be effected by the appliance. A bearing, $1^a$, for an operating screw, is formed upon or secured to one end of the support, 1, and a lower guide bar, $1^b$, preferably, as shown, formed integral with it, extends longitudinally along its top, the face of said guide bar being finished truly and being parallel with the axis of the bearing. $1^a$. An upper guide bar, $1^c$, is secured to the top of said bearing and to the opposite end of the support, 1. An operating screw, 2, is journaled to rotate freely, but without the capacity of longitudinal movement, in the bearing, $1^a$, said screw engaging the thread of a nut, 3, which is fitted, in the manner of a cross head, between the guide bars, $1^b$ and $1^c$, and is provided with lateral lips or flanges, $3^a$, on its top and bottom, which flanges abut against the sides of the guide bars, and prevent lateral movement of the nut, while permitting its free longitudinal movement in one or the other direction, in accordance with the direction of rotation of the screw, 2, which is effected by a hand wheel, $2^a$, fixed thereon adjacent to the bearing, $1^a$, and carrying a handle, $2^b$. The screw and nut are held stationary in any position of the latter, by a latch, $2^c$, pivoted to the upper guide bar, $1^b$, and adapted to be forced into engagement with any one of a plurality of notches, $2^d$, in the hub of the hand wheel, by a spring, $2^e$, fitting in a recess in the upper guide bar. The position of the nut, 3, for full forward or back motion, or point of cut off in either direction, is indicated by a figured scale, $2^f$, fixed to the top guide bar.

The lifting shaft arm, link, or other valve operating mechanism member, the position of which is to be adjusted by the appliance, and which, as it does not form part of my invention, is not herein shown, is coupled to one end of a reach rod, 4, the opposite end of which is connected to the nut, 3. In reverse gears of the type to which my invention relates, as known prior to my invention, it has been the practice to connect the reach rod with the adjusting mechanism through the intermediation of trunnions, jaws, or other offset couplings adapted for rectangular section solid bar reach rods. Connections of this character impose side strains upon the gear, involving undue wear and bending stresses, which it is a special object of my invention to prevent. To this end, the reach rod, 4, is coupled to the nut, 3, in line axially with the screw, 2, by a hollow connecting member, 5, so that the reach rod and reverse gear are subjected to strains of tension and compression only, bending strain being eliminated. The connecting member, 5, is preferably, as shown, formed of a section of heavy pipe, of diameter sufficient to permit it to move entirely clear of the screw, and is connected at one end to the nut, 3, by being screwed into a hub or boss on the adjacent end thereof, and at the other end, is screwed into a head, 6, which is fitted to slide between spherical faced guides, 7, in line axially with the screw, 2. The head, 6, is pivoted by a bolt, 6ª, to a jaw, 4ª, on the adjacent end of the reach rod, the joint thus provided between the reach rod and the nut, 3, permitting flexibility in a vertical plane; preventing bending in operation; and obviating the necessity of great accuracy of alinement in erection.

While the hollow connecting member, 5, is herein shown as a section of pipe, this being the form in which it can be most conveniently and economically applied, it will be obvious that such specific form is not of the essence of my invention, and that any other hollow member, by which is meant one presenting a central space of diameter greater than that of the screw, as, for example, a plurality of separated rods or bars, may be substituted in the discretion of the constructor.

Figs. 6 to 13 inclusive illustrate a modified form of the appliance, embodying all the essential features of that above described, but differing therefrom structurally in the character and location of the articulation of the nut with the reach rod. In this instance, the nut, 3, instead of being fitted directly between the upper and lower guide bars, 1ᶜ, 1ᵇ, as in the construction first described, is held against rotation in a cross head, 8, which is fitted to slide between the guide bars and provided with lips or flanges, 8ª, fitting against the sides thereof. The nut is held against longitudinal movement in the cross head by a removable cap plate, 8ᵇ, and bolts, 8ᶜ. The hollow connecting member, 5, instead of being, as before, rigidly connected to the nut and jointed to the reach rod, is oppositely disposed, that is to say, is rigidly connected to the reach rod, and is provided at its opposite end, with a ball or spherical faced enlargement, 5ª, fitting a corresponding socket in the cross head, 8, which carries the nut, and held therein with the capacity of movement as a universal joint, by a cap plate, 8ᵈ, and the bolts, 8ᶜ. It will be seen that the same flexibility is provided by the ball joint thus formed as in the instance first described.

The advantage, in practical service, of my invention, in the provision of an articulated connection between the operating screw and reach rod, in or substantially in line axially with said members, and the consequent elimination of the lateral strains imposed upon the gear in the use of the prior offset constructions, will be apparent to those familiar with locomotive engine construction and operation. A further advantage is presented in the structural simplicity of the appliance, and its ready adaptability to standard conditions.

I claim as my invention, and desire to secure by Letters Patent:

1. In a steam engine reverse gear, the combination of an operating screw rotatable without longitudinal movement, a nut engaging said screw and fitted to move longitudinally but without rotation, and a reach rod connected to said nut, substantially in the axial line of the operating screw.

2. In a steam engine reverse gear, the combination of an operating screw rotatable without longitudinal movement, a nut engaging said screw and fitted to move longitudinally but without rotation, and a reach rod coupled by an articulated connection to said nut, substantially in the axial line of the operating screw.

3. In a steam engine reverse gear, the combination of a support having a bearing at one end and a longitudinal guide parallel therewith, an operating screw fitted to rotate without end movement in said bearing, a nut engaging said screw and fitted to traverse longitudinally on said guide, a reach rod connected to said guide substantially in the axial line of the operating screw, and means for permitting movement of the reach rod, in a vertical plane, relatively to the guide.

4. In a steam engine reverse gear, the combination of a support having a bearing at one end and a longitudinal guide parallel therewith, an operating screw fitted to rotate without end movement on said bearing, a nut engaging said screw and fitted to move longitudinally on said guide, a reach rod, and an articulated connection coupling said reach rod to said nut, substantially in the axial line of the operating screw.

5. In a steam engine reverse gear, the combination of a support having a bearing at one end and a longitudinal guide parallel therewith, an operating screw fitted to rotate without end movement in said bearing, a nut engaging said screw and fitted to move longitudinally on said guide, a reach rod, and a hollow connecting member coupling said reach rod to said nut, substantially in the axial line of the operating screw.

6. In a steam engine reverse gear, the combination of a support having a bearing at one end, and a longitudinal guide parallel therewith, an operating screw fitted to rotate without end movement in said bearing, a nut engaging said screw and fitted to move longitudinally on said guide, a reach rod, and a hollow connecting member coupling said reach rod to said nut, substantially in the axial line of the operating screw, and articulated at one of its ends to the adjacent member.

7. In a steam engine reverse gear, the combination of a support having a bearing at one end and a longitudinal guide parallel therewith, an operating screw fitted to rotate without end movement in said bearing, a nut engaging said screw and fitted to move longitudinally on said guide, a hollow connecting member secured at one end to said nut, a head fixed to the opposite end of said connecting member, a guide for said head, a reach rod, and a swinging joint coupling said reach rod to said head, substantially in the axial line of the operating screw.

8. In a steam engine reverse gear, the combination of a support having a bearing at one end and a longitudinal guide parallel therewith, an operating screw fitted to rotate without end movement in said bearing, a nut engaging said screw, and fitted to move longitudinally on said guide, a hollow connecting member secured at one end to said nut, a head fixed to the opposite end of said connecting member, a spherical faced guide for said head, a reach rod, and a pin coupling said reach rod to said head, in and transversely to the axial plane of the operating screw.

FRANCIS J. COLE.

Witnesses:
S. W. TYLER,
FRANK F. SCOVILLE.